United States Patent
Bolay et al.

(10) Patent No.: US 8,082,587 B2
(45) Date of Patent: Dec. 20, 2011

(54) DETECTING CONTENT IN FILES

(75) Inventors: Kai Bolay, Waltham, MA (US); Derek Bruneau, Watertown, MA (US); Shane Dupree, Somerville, MA (US); Benjamin Joseph, Lexington, MA (US); Gregory Kindel, Waltham, MA (US); Edward Schwab, Stanardsville, VA (US); Chandra Yadav, Waltham, MA (US); Jeffrey Trout, Tewksbury, MA (US)

(73) Assignee: Lycos, Inc., Waltham, MA (US)

( * ) Notice: Subject to any disclaimer, the term of this patent is extended or adjusted under 35 U.S.C. 154(b) by 732 days.

(21) Appl. No.: 11/829,501

(22) Filed: Jul. 27, 2007
(Under 37 CFR 1.47)

(65) Prior Publication Data
US 2008/0154971 A1    Jun. 26, 2008

Related U.S. Application Data

(60) Provisional application No. 60/834,963, filed on Aug. 2, 2006.

(51) Int. Cl.
*G06F 11/00* (2006.01)
*G06F 12/14* (2006.01)
*G06F 12/16* (2006.01)
*G08B 23/00* (2006.01)
*G06F 11/30* (2006.01)
*G06F 9/00* (2006.01)
*G06F 17/00* (2006.01)

(52) U.S. Cl. ............... 726/24; 726/22; 726/23; 726/25; 726/26; 726/11; 713/188

(58) Field of Classification Search .................. None
See application file for complete search history.

(56) References Cited

U.S. PATENT DOCUMENTS

| | | | |
|---|---|---|---|
| 5,649,095 A * | 7/1997 | Cozza ........................... | 714/39 |
| 6,968,461 B1 * | 11/2005 | Lucas et al. .................... | 726/22 |
| 2003/0046558 A1 * | 3/2003 | Teblyashkin et al. ......... | 713/188 |
| 2005/0021994 A1 * | 1/2005 | Barton et al. ................. | 713/200 |
| 2007/0079379 A1 * | 4/2007 | Sprosts et al. ................ | 726/24 |

* cited by examiner

*Primary Examiner* — Shin-Hon Chen
(74) *Attorney, Agent, or Firm* — Fish & Richardson P.C.

(57) ABSTRACT

A method for detecting undesirable content in a computer directory having a digital file includes performing a size check on the digital file, the size check returning a first passing condition or a first failing condition, if the size check returns the first passing condition, the method further includes performing one or more behavioral indicator checks on the digital file, and determining whether the digital file contains undesirable content based on the one or more behavioral indicator checks.

24 Claims, 2 Drawing Sheets

US 8,082,587 B2

DETECTING CONTENT IN FILES

CLAIM TO PRIORITY

This patent application claims the benefit of, and priority to, U.S. Provisional Application No. 60/834,963, which was filed on Aug. 2, 2006. The contents of U.S. Provisional Application No. 60/834,963 are hereby incorporated by reference into this patent application as if set forth herein in full.

TECHNICAL FIELD

This patent application relates to a system for detecting content in digital files.

BACKGROUND

Web page hosting providers often attract users who wish to use their services to store illegal or undesirable content, primarily in the form of pirated software programs, pirated media files, and pornographic images. These files consume disk space and bandwidth better used for more legitimate purposes. The distributors of undesirable content go to great lengths to hide or disguise their files among the millions of other flies stored by a typical web page host, making it difficult for providers to identify them.

SUMMARY

In general, this patent application describes a method for detecting undesirable content in a computer directory. The method comprises performing a size check on the digital file, where the size check returns a first passing condition or a first failing condition. If the size check returns the first passing condition, the method further comprises performing one or more behavioral indicator checks on the digital file, and determining whether the digital file contains undesirable content based on the one or more behavioral indicator checks. The method may also include one or more of the following features, taken alone or in combination.

The one or more behavioral indicator checks may comprise attempting to find a virus in the digital file, attempting to open the digital file, determining whether the digital file has a graphic file header but is not a graphic file type, determining whether the digital file has an archival file extension or a numeric file extension, determining whether a file extension of the digital file does not match a file header of the digital file, determining whether the digital file has an unidentifiable file header or file extension, attempting to find a virus in the digital file, and/or determining whether the digital file has an unidentifiable file header or file extension.

The one or more behavioral indicator checks return a second passing condition or a second failing condition. If a behavioral indicator check results in the second failing condition, the method may comprise incrementing one of a bad byte count or a suspect byte count, where the bad byte count and the suspect byte count comprise counters, and terminating behavioral indicator checks on the digital file. If a behavioral indicator check results in the second passing condition, the method may comprise incrementing a good byte count, where the good byte count comprises a counter.

The computer directory may contain plural digital files and, if all the digital files are audio/video files having a same file byte size, the method may comprise flagging the computer directory as an undesirable directory.

The method may include calculating a bad byte percentage using the bad byte count and a byte number total. If the bad byte percentage is greater than a third minimum number, then the method may comprises flagging the computer directory as an undesirable directory. The byte number total comprises a total number of bytes of the digital files in the computer directory. The method may comprise calculating a suspect byte percentage using the suspect byte count and a byte number total. If the suspect byte percentage is greater than a third minimum number, then the method may comprise flagging the computer directory as an undesirable directory.

The method may comprise determining whether the directory contains more than a predetermined number of files having an acceptable file format, and performing the size check only if the directory contains more than a predetermined number of files having the acceptable file format. Performing the size check may comprise comparing a file byte size of the digital file to a minimum number, where the file byte size comprises the number of bytes in the digital file. The size check returns the first passing condition if file byte size is greater than or equal to the minimum number, and the size check returns the first failing condition if the file byte size is less than the minimum number.

If the size check returns the first failing condition, the method may comprise selecting a second digital file, and performing the method using the second digital file.

The foregoing method, and any feature thereof, may be implemented as a computer program product comprised of instructions that are stored on one or more machine-readable media, and that are executable on one or more processing devices. The foregoing method, and any feature thereof may be implemented as an apparatus or system that includes one or more processing devices and memory to store executable instructions to implement the method.

The details of one or more examples are set forth in the accompanying drawings and the description below. Further features, aspects, and advantages will become apparent from the description, the drawings, and the claims.

DETAILED DESCRIPTION

Figure 1:
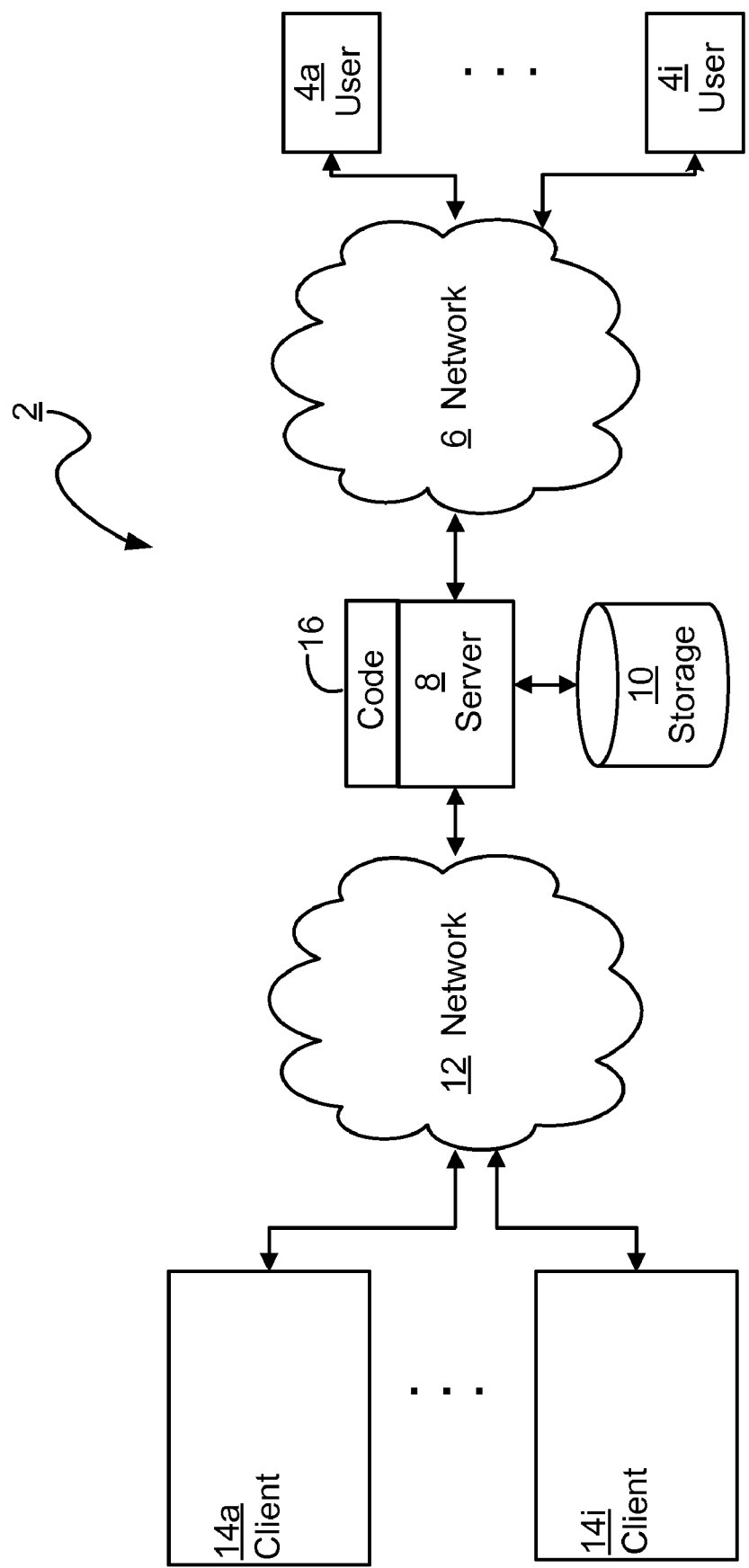
FIG. 1 is a diagram of a system capable of executing code for detecting undesirable content in digital files.

Referring to FIG. 1, network computer system 2 supports code 16 for detecting undesirable content in digital files. In this context, "detecting" includes (but is not limited to) inferring whether a digital file contains undesirable content based on whether the digital file passes or fails one or more tests. Network computer system 2 includes users 4a to 4i which interact with server 8 and storage 10 through network 6. Network 6 may be an IP-enabled network, and may include a local area network (LAN), such as an intranet, and/or a wide area network (WAN), which may, or may not include the Internet. Network 6 may be wired, wireless, or a combination of the two.

Users 4a to 4i may use, for example, computers to access server 8 through network 6. Users can upload digital files to server 8. The files are stored in storage 10 for later retrieval or for archival use. Storage 10 can be, for example, a computer hard drive, flash media, or other digital file storage device. In this implementation, code 16 for detecting undesirable content in digital files is installed on server 8. Code 16 may be a computer program comprised of executable instructions or a portion thereof. A copy of code 16 may be installed on, and run on, any server associated with system 2. In this regard, code 16 may be run on each server. Each server may analyze a subset of user directories on storage 10. For example, a first server may analyze directories belonging to users whose names begin with the letter "a", a second server may analyze directories belonging to users whose names begin with the letter "b", and so on. The analysis can be divided in any way depending, e.g., on how the users' directories are stored.

Clients 14a to 14i maybe one or more computer terminals through which a network administrator may enter some, or all of the configuration information for the code, as discussed below. Clients interact with server 8 and storage 10 through network 12. Network 12 may be an IP-enabled network, and may include a local area network (LAN), such as an intranet, and/or a wide area network (WAN), which may, or may not, include the Internet. Network 12 may be wired, wireless, or a combination of the two.

Code 16 analyzes computer directories and digital files stored in storage 10 for undesirable content in the digital files. In some implementations, network computer system 2 can be configured such that a single server can analyze all the digital files in the directories of storage 10. In some implementations, network computer system 2 is configured to distribute the analysis of computer directories across plural servers (other servers not shown) in order to reduce the time required to complete the analysis of all of the digital files in the computer directories.

Figure 2:
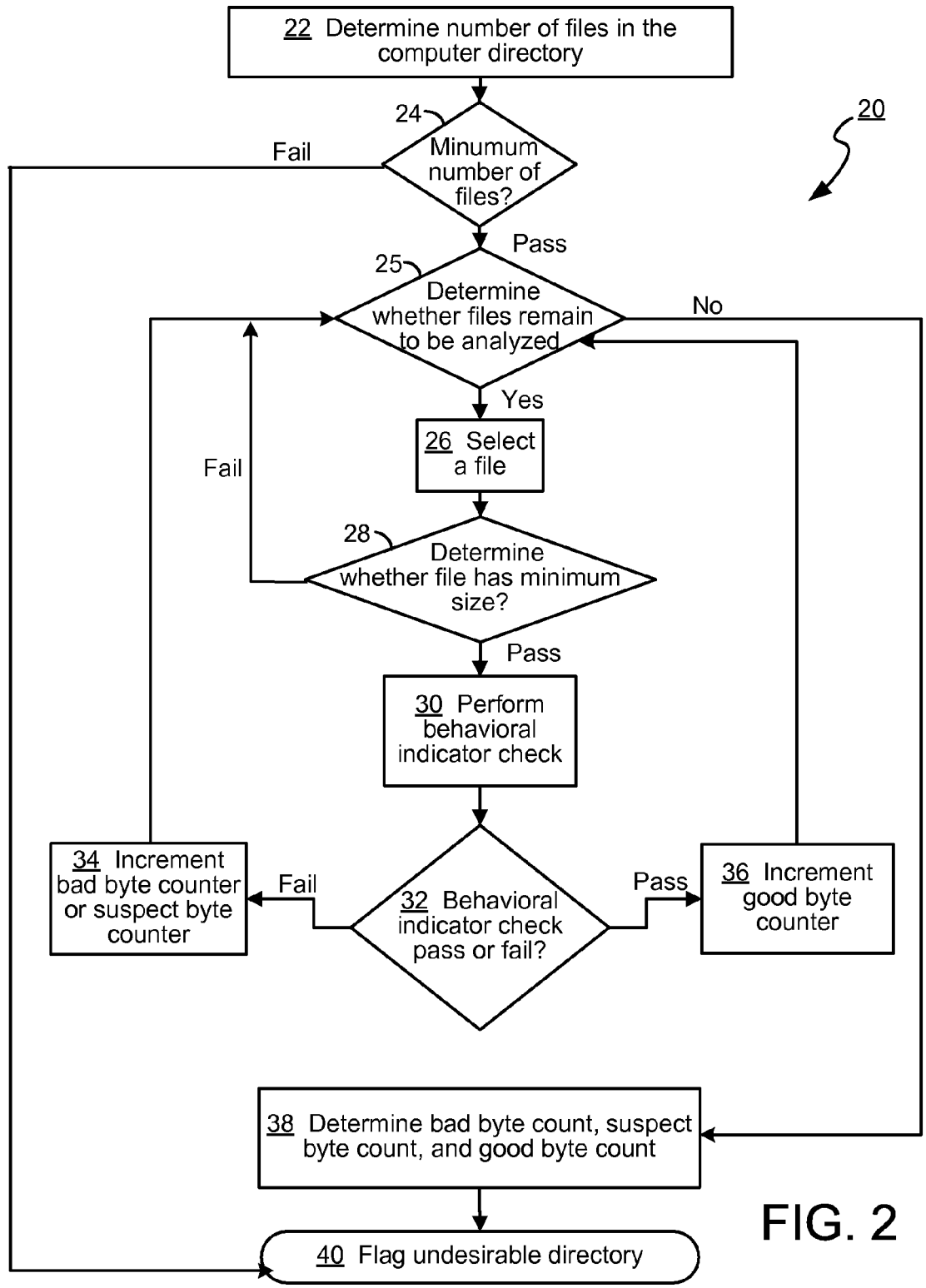
FIG. 2 is a flowchart of a process to detect undesirable content in digital files.

Referring now to FIG. 2, code 16 is executable to perform process 20. Process 20 can detect undesirable content in digital files stored in computer directories of storage 10. Given a computer directory containing one or more digital files, process 20 determines (22) the number of files in the computer directory that have predetermined (e.g., acceptable) file formats (e.g., acceptable file extensions). For example, the predetermined file formats can be hypertext markup language (.html), extensible markup language (.xml), graphical interchange format (.gif), text (.txt), and/or other formats. These formats can vary as digital file format standards evolve. It is noted that process 20 need not determine the actual file formats, but rather may only make a superficial examination of the file extensions in order to make its determination.

If the total number of files with the predetermined file formats (e.g., acceptable file extensions) is less than a configurable minimum number, process 20 flags (40) the computer directory as undesirable and stops processing the directory. In this implementation, only the files with the predetermined file formats are counted. In other implementations, all files, or some other subset thereof may be counted. An example of a setting for the minimum number of files with desirable extensions is one (1) (e.g., any directory with at least one file that appears legitimate will pass). However, the configurable minimum number may be any number.

Process 20 may flag (40) the computer directory by creating a pointer to the director. The flagging process can be implemented in a number of ways. In one example, the process displays a result (e.g., "good", "bad", or "suspect") on a computer terminal screen for each directory it has analyzed. An administrator can then take appropriate action manually. Alternatively, the process may write each result to a log file that can be processed by a separate script that bans any files flagged with "bad" and, optionally, any files flagged with "suspect". In this implementation, the good byte count is used for information purposes only. Administrators may use the good byte count to verify that the software is running as expected and not flagging directories incorrectly.

If the total number of files with the predetermined file formats is greater than or equal to the configurable minimum number, process 20 determines (25) whether there are files remaining to be analyzed. If there are no files remaining to be analyzed, then process 20 determines (38) the bad byte count, suspect byte count, and good byte count, and flags (40) undesirable directory, if necessary. If there are files remaining to be analyzed, process 20 selects (26) a digital file in the computer directory for analysis of undesirable content. Process 20 determines the size of the digital file, for example, by calculating the number of bytes of the file, and compares (28) the size with configurable minimum number of bytes. If the size of the digital file is determined (28) to be smaller than this configurable minimum number, process 20 ignores the digital file, determines (25) if there is another digital file to be analyzed, and if so, selects (26) another digital file in the computer directory. Again, if there, are no files remaining to be analyzed, then process 20 determines (38) the bad byte count, suspect byte count, and good byte count, and flags (40) undesirable directory, if necessary. Otherwise, if the size of the digital file is determined to be greater than or equal to this configurable minimum number, the process 20 performs (30) one or more behavioral indicator checks on the digital file.

The behavioral indicator checks are configured to analyze digital files based on characteristics of the digital file, for example, by comparing the file's extension or header with known extensions or headers associated with undesirable content. Process 20 can make a determination of whether a user is storing undesirable content in a computer directory if the digital files of the directory "pass" or "fail" the behavioral indicator checks. Examples of the behavioral indicator checks include, but are not limited to those described below. Furthermore, one or more checks may be combined, and the order in which the checks are performed may vary.

Process 20 can employ antivirus software to check the digital file for computer viruses. For example, antivirus software can examine digital files for file extensions commonly associated with viruses. The virus check can examine the content of a file for virus signatures provided by a recognized antivirus software toolkit such as ClamAV. The file's extension may, or may not, be examined during this check, however. If the antivirus software determines that the digital file contains, or could contain, a virus, the digital file fails this behavioral indicator check.

Process 20 can attempt to open the digital file as a behavioral indicator check. If the digital file is unable to be opened, the digital file fails this behavioral indicator check. For example, the attempt to open the file might fail because the file's name or the files content(s) do not match that which is permitted by a current operating system.

Process 20 can run a behavioral indicator check to determine whether the digital file has a graphic file header, such as a header for a graphic interchange format (GIF), joint photographic experts group (JPEG), portable network graphics (PNG), or other graphics type file, but the file itself does not otherwise have graphic file characteristics. If the digital file indeed has a graphic file header but does not otherwise have graphic file characteristics, the digital file fails this behavioral indicator check. In one implementation, the graphic file check compares a file's extension (e.g. ".gif") with its header (e.g., the initial bytes of the file) and/or its footer (e.g., the final bytes of the file) and/or the other parts of the file. If the content of the file does not match the defined rules for the format indicated by the extension, then the file fails this check.

Process 20 can run a behavioral indicator check to determine whether the digital file has a predetermined undesirable file extension or file header type. Some undesirable file extension and file header types include archival file extensions and file headers, for example, ".lzh", ".zip", ".rar", ".ace", ".smc"

and ".dat", or numeric file extensions, for example, ".102". Such file extensions and file headers are commonly associated with pirated software or otherwise undesirable file content. If the digital file has a predetermined undesirable file extension or file header type, the digital file fails this behavioral indicator check.

Process 20 can run a behavioral indicator check to determine whether the digital file has a file extension that does not match its file header. For example, if the file header declares the digital file to be an audio/video file type such as AVI, MP3, WAV, WMA, WMV, or others, but the file extension does not correspond to an audio/video file type, the digital file fails the check. In another example, if the file header declares the digital file to be a Microsoft Office or Adobe Acrobat file, but the file extension does not correspond to such a file type, the digital file fails the check.

Process 20 can run a behavioral indicator check to determine whether the digital file has an unidentifiable or missing file header or file extension. If the digital file has an unidentifiable or missing file header or file extension, the digital file fails this behavioral indicator check.

As mentioned above, process 20 can run one or more of the above behavioral indicator checks on a digital file. If the digital file "fails" a behavioral indicator check, process 20 increments (34) one of a bad byte counter or a suspect byte counter by the size of the digital file. The bad byte counter and suspect byte counter keep a running count of the number of bytes of the digital files in the computer directory deemed by the software to likely contain undesirable content. Process 20 then determines (25) whether there are files remaining to be analyzed, and if so, selects another file (26) in the computer directory. Again, if there are no files remaining to be analyzed, then process 20 determines (38) the bad byte count, suspect byte count, and good byte count, and flags (40) undesirable directory, if necessary.

In some implementations, if the digital file does not fail any of the one or more behavioral indicator checks, process 20 issues a "passing" condition of the digital file. Process 20 increments (36) a good byte counter, which is a running count of number of bytes of the digital files in the computer directory deemed by the software to less likely contain undesirable content.

As discussed above, once process 20 determines (25) that there are no files remaining to be analyzed, then process 20 determines (38) the total bad byte count, suspect byte count, and good byte count as incremented by the bad byte counter, suspect byte counter, and good byte counter, respectively. In some implementations, process 20 uses the total bad byte count, suspect byte count, and good byte count to determine (40) if the computer directory has undesirable content as a whole. Examples include, but are not limited to the following.

If the bad byte count is greater than a maximum number (e.g., about 10 megabytes or 10*1024*1024 bytes), the process 20 flags the computer directory as undesirable 40 and stops processing the directory.

Process 20 can calculate a bad byte percentage using the bad byte count and a byte number total comprising the total number of bytes of the digital files in the computer directory. If the bad byte percentage is greater than a maximum number (e.g., 20%), process 20 flags (40) the computer directory as undesirable and stops processing it.

Process 20 can calculate a suspect byte percentage using the suspect byte count and a byte number total comprising the total number of bytes of the digital files in the computer directory. If the suspect byte percentage is greater than a maximum number, the process 20 flags (40) the computer directory as undesirable and stops processing it.

If all the digital files in the computer directory are audio/video files of the same size, the process 20 flags (40) the computer directory as undesirable and stops processing it.

All or part of process 20, and any modifications thereto described herein, (hereinafter, "the processes") can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions described herein. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Actions associated with the processes can be rearranged and/or one or more such actions can be omitted to achieve the same, or similar, results to those described herein.

A number of implementations have been described. Accordingly, other implementations are within the scope of the following claims. For example, in an alternative implementation, process 20 can flag (40) undesirable directories while it is determined (26) that there are digital files remaining to be analyzed. In another alternative implementation, process 20 can be run on each of clients 14*a* to 14*i* or on a combination of a client and server 8. Similarly, components of process 20 can be distributed across network computer system 2 and run on different machines (e.g., a combination of servers and/or clients). Thus, it will be understood that various modifications can be made without departing from the spirit and scope of the application.

Elements of different embodiments described herein may be combined to form other embodiments not specifically set forth above. Other embodiments not specifically described herein are also within the scope of the following claims.

What is claimed is:

1. A method for detecting undesirable content in a computer directory comprising:
   determining whether the computer directory contains more than a predetermined number of files having an acceptable file format, the computer directory storing different types of files that are separately usable in different operations of a computer, the determining being performed with respect to the different types of files in the computer directory;
   if the computer directory does not contain more than the predetermined number of files having the acceptable file format, flagging the directory as undesirable and stopping detecting undesirable content in the computer directory;
   if the computer directory contains more than the predetermined number of files having the acceptable file format, performing a size check on a digital file in the computer directory, the size check returning a first passing condition or a first failing condition;
   if the size check returns the first passing condition, the method further comprises:
      performing one or more behavioral indicator checks on the digital file; and
      determining whether the digital file contains undesirable content based on the one or more behavioral indicator checks.

2. The method of claim 1, wherein the one or more behavioral indicator checks comprise:
   attempting to find a virus in the digital file; and
   attempting to open the digital file.

3. The method of claim 1, wherein the one or more behavioral indicator checks comprise:
   determining whether the digital file has a graphic file header but is not a graphic file type; and
   determining whether the digital file has an archival file extension or a numeric file extension.

4. The method of claim 1, wherein the one or more behavioral indicator checks comprise:
   determining whether a file extension of the digital file does not match a file header of the digital file; and
   determining whether the digital file has an unidentifiable file header or file extension.

5. The method of claim 1, wherein the one or more behavioral indicator checks comprise:
   attempting to find a virus in the digital file;
   attempting to open the digital file;
   determining whether the digital file has a graphic file header but is not a graphic file type;
   determining whether the digital file has an archival file extension or a numeric file extension;
   determining whether a file extension of the digital file does not match a file header of the digital file; and
   determining whether the digital file has an unidentifiable file header or file extension.

6. The method of claim 1, wherein the one or more behavioral indicator checks return a second passing condition or a second failing condition, and wherein, if a behavioral indicator check results in the second failing condition, the method further comprises:
   incrementing one of a bad byte count or a suspect byte count, the bad byte count and the suspect byte count comprising counters; and
   terminating behavioral indicator checks on the digital file.

7. The method of claim 6, wherein, if a behavioral indicator check results in the second passing condition, the method further comprises incrementing a good byte count, the good byte count comprising a counter.

8. The method of claim 7, wherein the method further comprises:
   calculating a bad byte percentage using the bad byte count and a byte number total, wherein if the bad byte percentage is greater than a minimum number, then the method further comprises flagging the computer directory as an undesirable directory;
   wherein the byte number total comprises a total number of bytes of the digital files in the computer directory.

9. The method of claim 7, wherein the method further comprises:
   calculating a suspect byte percentage using the suspect byte count and a byte number total, wherein if the suspect byte percentage is greater than a minimum number, then the method further comprises flagging the computer directory as an undesirable directory;
   wherein the byte number total comprises a total number of bytes of the digital files in the computer directory.

10. The method of claim 1, wherein the computer directory contains plural digital files and if all the digital files are audio/video files having a same file byte size, the method further comprises flagging the computer directory as an undesirable directory.

11. The method of claim 1, further comprising:
   wherein performing the size check comprises:
      comparing a file byte size of the digital file to a minimum number, the file byte size comprising the number of bytes in the digital file;
      wherein the size check returns the first passing condition if file byte size is greater than or equal to the minimum number; and
      wherein the size check returns the first failing condition if the file byte size is less than the minimum number.

12. The method of claim 1, wherein, if the size check returns the first failing condition, the method further comprises:
   selecting a second digital file; and
   performing the method using the second digital file.

13. One or more non-transitory computer-readable storage media for storing instructions to detect undesirable content in a computer directory comprising a digital file, the instructions being executable by one or more processing devices to:
   determine whether the computer directory contains more than a predetermined number of files having an acceptable file format, the computer directory storing different types of files that are separately usable in different operations of a computer, the determining being performed with respect to the different types of files in the computer directory;
   if the computer directory does not contain more than the predetermined number of files having the acceptable file format, flag the directory as undesirable and stop detecting undesirable content in the computer directory;
   if the computer directory contains more than the predetermined number of files having the acceptable file format, perform a size check on a digital file, the size check returning a first passing condition or a first failing condition;

if the size check returns the first passing condition, the instructions further comprise instructions that are executable by one or more processing devices to:
perform one or more behavioral indicator checks on the digital file; and
determine whether the digital file contains undesirable content based on the one or more behavioral indicator checks.

14. The one or more non-transitory computer-readable storage media of claim 13, wherein the one or more behavioral indicator checks comprise:
attempting to find a virus in the digital file; and
attempting to open the digital file.

15. The one or more non-transitory computer-readable storage media of claim 13, wherein the one or more behavioral indicator checks comprise:
determining whether the digital file has a graphic file header but is not a graphic file type; and
determining whether the digital file has an archival file extension or a numeric file extension.

16. The one or more non-transitory computer-readable storage media of claim 13, wherein the one or more behavioral indicator checks comprise:
determining whether a file extension of the digital file does not match a file header of the digital file; and
determining whether the digital file has an unidentifiable file header or file extension.

17. The one or more non-transitory computer-readable storage media of claim 13, wherein the one or more behavioral indicator checks comprise:
attempting to find a virus in the digital file;
attempting to open the digital file;
determining whether the digital file has a graphic file header but is not a graphic file type;
determining whether the digital file has an archival file extension or a numeric file extension;
determining whether a file extension of the digital file does not match a file header of the digital file; and
determining whether the digital file has an unidentifiable file header or file extension.

18. The one or more non-transitory computer-readable storage media of claim 13, wherein the one or more behavioral indicator checks return a second passing condition or a second failing condition, and wherein, if a behavioral indicator check results in the second failing condition, the one or more machine-readable media further comprises instructions to:
increment one of a bad byte count or a suspect byte count, the bad byte count and the suspect byte count comprising counters; and
terminate behavioral indicator checks on the digital file.

19. The one or more non-transitory computer-readable storage media of claim 18, wherein, if a behavioral indicator check results in the second passing condition, the one or more machine-readable media further comprises instructions to increment a good byte count, the good byte count comprising a counter.

20. The one or more non-transitory computer-readable storage media of claim 18, further comprising instructions to:
calculate a bad byte percentage using the bad byte count and a byte number total, wherein if the bad byte percentage is greater than a minimum number, then the one or more machine-readable further comprises instructions to flag the computer directory as an undesirable directory;
wherein the byte number total comprises a total number of bytes of the digital files in the computer directory.

21. The one or more non-transitory computer-readable storage media of claim 13, wherein the computer directory contains plural digital files and if all the digital files are audio/video files having a same file byte size, the one or more machine-readable media further comprises instructions to flag the computer directory as an undesirable directory.

22. The one or more non-transitory computer-readable storage media of claim 18, further comprising instructions to:
calculate a suspect byte percentage using the suspect byte count and a byte number total, wherein if the suspect byte percentage is greater than a minimum number, then the one or more machine-readable further comprises instructions to flag the computer directory as an undesirable directory;
wherein the byte number total comprises a total number of bytes of the digital files in the computer directory.

23. The one or more non-transitory computer-readable storage media of claim 13, further comprising instructions to:
wherein performing the size check comprises:
comparing a file byte size of the digital file to a minimum number, the file byte size comprising the number of bytes in the digital file;
wherein the size check returns the first passing condition if file byte size is greater than or equal to the minimum number; and
wherein the size check returns the first failing condition if the file byte size is less than the minimum number.

24. The one or more non-transitory computer-readable storage media of claim 13, wherein, if the size check returns the first failing condition, the one or more machine-readable media further comprises instructions to:
select a second digital file; and
execute the instructions to detect undesirable content for the second digital file.

* * * * *